United States Patent [19]

Vittone et al.

[11] Patent Number: 4,917,749

[45] Date of Patent: Apr. 17, 1990

[54] PROCESS FOR THE CONTINUOUS PRODUCTION OF MANUFACTURED ARTICLES REINFORCED WITH MIXTURES OF HYDRAULIC BINDERS

[75] Inventors: Andrea Vittone, Milan; Giuseppe Chiappini, Albiano Magra; Massimo Di Paola, Rapallo, all of Italy

[73] Assignee: Mopfelan S.p.A., Milan, Italy

[21] Appl. No.: 150,046

[22] Filed: Jan. 29, 1988

Related U.S. Application Data

[62] Division of Ser. No. 829,101, Feb. 14, 1986, Pat. No. 4,767,491.

[30] Foreign Application Priority Data

Feb. 15, 1985 [IT] Italy .............................. 19535 A/85

[51] Int. Cl.$^{4}$ .............................. B32B 31/08

[52] U.S. Cl. .............................. 156/242; 156/243; 156/500; 264/70; 264/87; 425/85; 425/92; 425/224

[58] Field of Search .................. 156/39, 42, 242, 243, 156/500; 264/70, 87, 165, 256, DIG. 43; 425/85, 92, 93, 101, 224, 505, 506

[56] References Cited

U.S. PATENT DOCUMENTS

| | | | |
|---|---|---|---|
| Re. 32,037 | 11/1985 | Clear | 156/243 |
| 3,600,771 | 8/1971 | Dyrander | 425/85 |
| 4,267,136 | 5/1981 | Bijen | 264/87 |
| 4,344,804 | 8/1982 | Bijen et al. | 264/87 |
| 4,383,960 | 5/1983 | Delcolgne et al. | 264/87 |
| 4,477,300 | 10/1984 | Pilgrim | 264/70 |
| 4,594,210 | 6/1986 | Vittone et al. | 264/70 |

*Primary Examiner*—Caleb Weston

*Attorney, Agent, or Firm*—Stevens, Davis, Miller & Mosher

[57] ABSTRACT

Device for the continuous manufacture of manufactured articles reinforced with mixtures of hydraulic binders and consisting of:

- a conveyor belt;
- a plurality 'A' of process stations for the formation of superimposed thin and uniform layers of a net of a hydraulic binder mix, each station consisting of:
  - a feeder of the reinforced net 4;
  - a wetting and degassing device 5 of the net 4;
  - a means 2 for metering the binders mix;
  - a section 7 for feeding and laying the net 4 on the conveyor belt 1;
  - compacting elements 16;
  - a means 6 for the extraction of water during the compacting state; and
  - a second metering device 2' for the hydraulic binders mix;
- a levelling and sizing station 23;
- a final water-extracting station 26;
- a pressing station 27;
- a longutudinal and cross-cutting station 35, and
- a gathering station 36 for the produced plates.

4 Claims, 6 Drawing Sheets

PROCESS FOR THE CONTINUOUS PRODUCTION OF MANUFACTURED ARTICLES REINFORCED WITH MIXTURES OF HYDRAULIC BINDERS

This is a continuation of application Ser. No. 829,101 filled Feb. 14, 1986, now U.S. Pat. No. 4,767,491.

The present invention concerns a device for the continuous manufacture of articles reinforced by means of hydraulic binders mixes and the corresponding process.

BACKGROUND OF THE INVENTION

The manufactured articles, also in the form of plates, consisting of mixes of hydraulic binders such as cement, reinforced with open nets of fibrilled synthetic films, in particular polyolefinic films, are currently known in the art.

Said manufactured articles have high physical-mechanical characteristics, and more particularly they show high resistance to bending stresses, a high tensile strength, high impact resistance, a high fatigue strength, a high resistance to low temperature and to water permeability and other properties that make those articles particularly suited for use in the building industry.

The continuous manufacturing process for such reinforced manufactured articles shows, however, a number of drawbacks that are mainly due to the fact that the incorporation into the hydraulic binder of one or more net-shaped structures of the previously mentioned type, each formed by a plurality of superimposed fibrilled polymeric films, hardly leads to a uniform, capillary diffusion of the binder into the net-shaped structure. In fact, especially when the manufacturing process is conducted at industrially competitive production rates air bubbles form and portions of the reinforcing net are not uniformly impregnated.

Various processes and devices have been suggested for the preparation of such manufactured articles made with hydraulic binders and reinforced with either metal nets or with fibers or net of natural, artificial or synthetic polymers. All the considered known devices and processes show, however, several drawbacks which unfavorably reflect on the quality of the produced reinforced plates, the characteristics of which turn out to be non-homogeneous and rather low grade, with a consequent prejudice to their practical application.

More particularly, in the known devices the feeding of the cement at the cement station does not occur uniformly as far as its quantity and distribution, with respect to the feeding of the reinforcing net, are concerned. Moreover, no account is taken of the air dragged along by the advancing net, while the contact between net and cement is, in general, carried out in such a way as not to ensure either the homogeneity of the composite or the correct impregnation of the net by the mix. Thus, the composite manufactured articles obtained are non-homogeneous and have poor physical-mechanical characteristics. Moreover, no sizing, levelling and superficial finishing systems of the plates are foreseen so as to obtain commercially acceptable. products.

Lastly, since the contact net/mix is only superficial, the air, trapped in the reinforcing structures, is not expelled, so that the adhesion between cement matrix and the reinforcing net is irregular and the structure of the composite article shows discontinuities, both on the surface an inside, due to the inclusion of air bubbles.

THE PRESENT INVENTION

An object of the present invention is to provide a device for carrying out the continuous preparation of reinforced manufactured articles based on hydraulic binders at industrially acceptable production rates, without there occurring the aboveindicated indicated drawbacks.

More particularly, an object of the present invention is that of providing a device that shall allow to produce in a continuous way reinforced manufactured articles based on hydraulic binders of a high regularity and homogeneity and displaying superior physical-mechanical characteristics.

According to the present invention, these and still other objects are achieved by means of a device comprising in the order given below:

(a) a conveyor belt comprising a porous material, for the forward feeding and advancing of reinforced net and of mix to various processing stations of the device;

(b) a plurality of stations for the formation of superimposed, thin and uniform layers of mixed hydraulic binders and a reinforcing net, each station comprising:

a feeder for the reinforcing net;

means for impregnating and preliminary degassing the reinforcing net;

a metering device means for dosing the hydraulic binders mix on the conveyor belt, suited for creating a thin layer of mix of a determined thickness;

a system for the feeding and deposition of the reinforcing net onto the thin mix layer resting on the conveyor belt;

compacting elements for the impregnation of the net in the hydraulic binder mix and for the ejection of residual air, and a subsequent doser means for the hydraulic binder mix;

(c) one or more stations for the levelling-sizing of the surface of obtained reinforced plate;

(d) stations for extraction of excessive water;

(e) one or more stations for pressing the reinforced plate;

(f) stations for the longitudinal and cross-cutting of the reinforced plate, and (g) a station for gathering the produced plates.

The stations for the formation of the superimposed layers are at least 2, but preferably are comprised between 3 and 10.

The reinforced-net feeder may be placed either above or sideways to the conveyor belt.

The means for the impregnation and degassing of the reinforcing net may consist of vats, spreading rollers, spraying units or other known means which lap and impregnate the net during its progress from the unwinding reel to the feeding and deposition on the conveyor belt roller. The impregnation and degassing agent consists of the diluted suspensions of hydraulic binder or of aqueous solutions containing surfactant of fluidizing products for the hydraulic binder.

Each doser of the hydraulic binders mix includes a containment box for the mix, open on its bottom and provided, at its two ends, with two revolving rolls whose distance, with respect to the conveyor belt may be suitably adjusted. With respect to the direction of progress of the net, the first roller revolves in the same direction as the net, while the second roller revolves in the opposite direction. In this way the first inlet roller feeds the mix of hydraulic binders, while the second outlet roller regulates the thickness of the thin mix layer which comes out of the containment box, effecting the dosing of the mix itself.

The system for the feeding and deposition of the reinforcing net on the conveyor belt carrying in thin mix layer, consists of two co-operating rollers with their surface fitted with points or pins, knurled or grooved. The reinforcing net passes between the first and the second roller and is immersed into the mix layer by the second roller, whose surface is placed near the conveyor belt, at a distance only slightly greater than the thickness of the mix layer.

The compacting elements have the task of immersing the reinforcing net into the thin layers of the mix and of eliminating the residual air dragged along by the reinforcing nets. One type of compacting element consists of a metal rocking arm, pivoted at one end and provided at its opposite end with percussion blades. Said percussion blades, which may have either a continuous or a notched edge, are directed towards the conveyor belt at an angle of 10°-90°, but preferably with a slanting angle of between 20° and 80°, with respect to the direction of progress of the conveyor belt. Said blades may effect a number of percussions on the composite net/mix layers comprised between 100 and 3,000 blows/minute, but preferably comprised between 200 and 1,000 blows/minute.

With this compacting element there may be associated other known types of compacting means such as, for instance, those with vibrating blades, which may operate with either horizontal, vertical or mixed horizontal/vertical vibrations, with reference to the plane of the conveyor belt. Underneath the compacting zones there are located stations for the extraction of the water, in order to collect excess water, leaving, however, at each station, in the mix a certain content in water sufficient to allow the welding together with the mix layer which is deposited successively. Said content in water stands in a relationship with the initial or starting water content in the mix and varies from 15% to 40% with respect to the dry binder.

The station for the levelling-sizing of the surface of the plate and comprising one or more mix/reinforcing net layers, consists of a metal plate provided with a vibrator that imparts to the station, rectilinear oscillating movement, both in a transversal as well as in a parallel direction with respect to that of the advancing or progressing movement of the conveyor belt. The plate is suspended at an adjustable height determined with respect to the conveyor belt in such a way as to rest only slightly on the composite plate.

The stations for the extraction of the excess water generally consist of vacuum generating aspirators which may be arranged on one or both faces of the plate.

The plate pressing station consists of a second conveyor belt of porous material, arranged on the upper part of the first conveyor belt. This second conveyor belt is slanted, with respect to the first conveyor belt, in such a way as to define between them a space that progressively becomes narrower from the inlet towards the outlet of the composite plate. Said second conveyor belt may be fitted with a washing and drying element that is placed on the opposite side to that facing the first conveyor belt. The pressing station may be provided with under-vacuum suction elements serving to eliminate the water that is freed during the pressing phase, and which are arranged above and beneath the composite plate.

The first conveyor belt, which feeds the various layers of mix/net and the resulting plate at the various stations of the device object of the present invention, is made of porous material s such as, for instance, felt, unwoven textiles and the like in natural, artificial or synthetic fibers, as well as in metal or mineral fibers or filaments.

The pressed plate is then cut both longitudinally and transversely in the desired size by cutting stations of a conventional type, and the cut pieces of the reinforced plate will then be received by a conveyor belt for either being stored or conveyor to successive finishing treatments, such as, for instance, forming.

This device allows to produce plates reinforced by two or more alternating layers of hydraulic binders and nets, while it also allows wide variations in the quality and compositions of the binders fed to the various stations, as well as in the types of feedable reinforcements, in the same operation, from various stations.

The process, which used the device object of the present invention, consists of the following steps, in the given order:

feeding to a porous conveyor belt of a mix of hydraulic binders in the form of a thin, uniform layer;

feeding to the conveyor belt a net-like structure with a reinforcing function, possibly pre-impregnated with solutions of surfacting or fluidizing agents for the hydraulic binder with aqueous dispersions of hydraulic binders or the like;

immersion and impregnation of the net-like structure in the thin-layer of mix, and its compacting with the hydraulic binder;

initial extraction of the excess water during the compacting state, until obtaining a content in water comprised between 15% and 40%, with respect to dry product;

following feeding of further layers of hydraulic binder mix alternated with nets made of fibrilled polyolefinic films, followed by compacting and extraction of the water;

levelling and sizing of the surface of the plate constituted of a plurality of hydraulic binder/net layers;

final extraction under vacuum of the water in excess;

pressing of the plate and removal of the outflowing water;

cutting up of the plate to the desired size or dimensions.

As hydraulic binders there may be used: cement, plaster, hydraulic lime and the like, either alone or in admixture with each other. Said binders may be additioned with fillers consisting of inorganic compounds, such as, for instance, silicon, calcium carbonate, sand, quartz sand, pumice, of surfactants, fluidizers, hardness accelerating or retarding agents, of water repellent agents of dyeing pigments, hydrosoluble dyes, synthetic resins, natural, artificial and synthetic fibers as well as of mineral fibers, of asbestos, of metal fibers or filaments, preferably of short lengths, etc.

The volumetric ration, water/binder, should be comprised between 25-75:100, but preferably 30-50:100. The reinforcing net-like structures consist of superimposed fibrilled synthetic films, in particular films of polyolefins, such as crystalline polypropylene made up predominantly of isotactic macromolecules of high and low density polyethylene, crystalline ethylene/propylene copolymers with a prevailing content of propylene, both of the random type as well as of the block type, or mixtures thereof.

The olefinic polymers are preferably added with various different compounds which have the function of facilitating the adhesion of the nets to the hydraulic binder. Said compounds may be calcium or magnesium carbonate, silicon, ground marble, cement, possuolana, powder glass, ground mineral ashes, zirconium salts, oxides or alkaline and alkaline-earth metals and the like.

The reinforced plates, prepared with the device and according to the process object of this present invention, find their application in the manufacture of flat or corrugated plates, of plumbing, of tanks, of paving tiles, of sound-absorbing and insulating panels, and generally in applications in the building industry.

The functional and constructional characteristics of the device for the continuous manufacture of articles based on mixes of hydraulic binders, object of the present invention, may be better understood by means of the following detailed description wherein reference is also made to the figures of the accompanying drawings and which represent only just a preferred embodiment, given for exemplifying purposes and in no way limitative, of said device and wherein:

Figure 1:
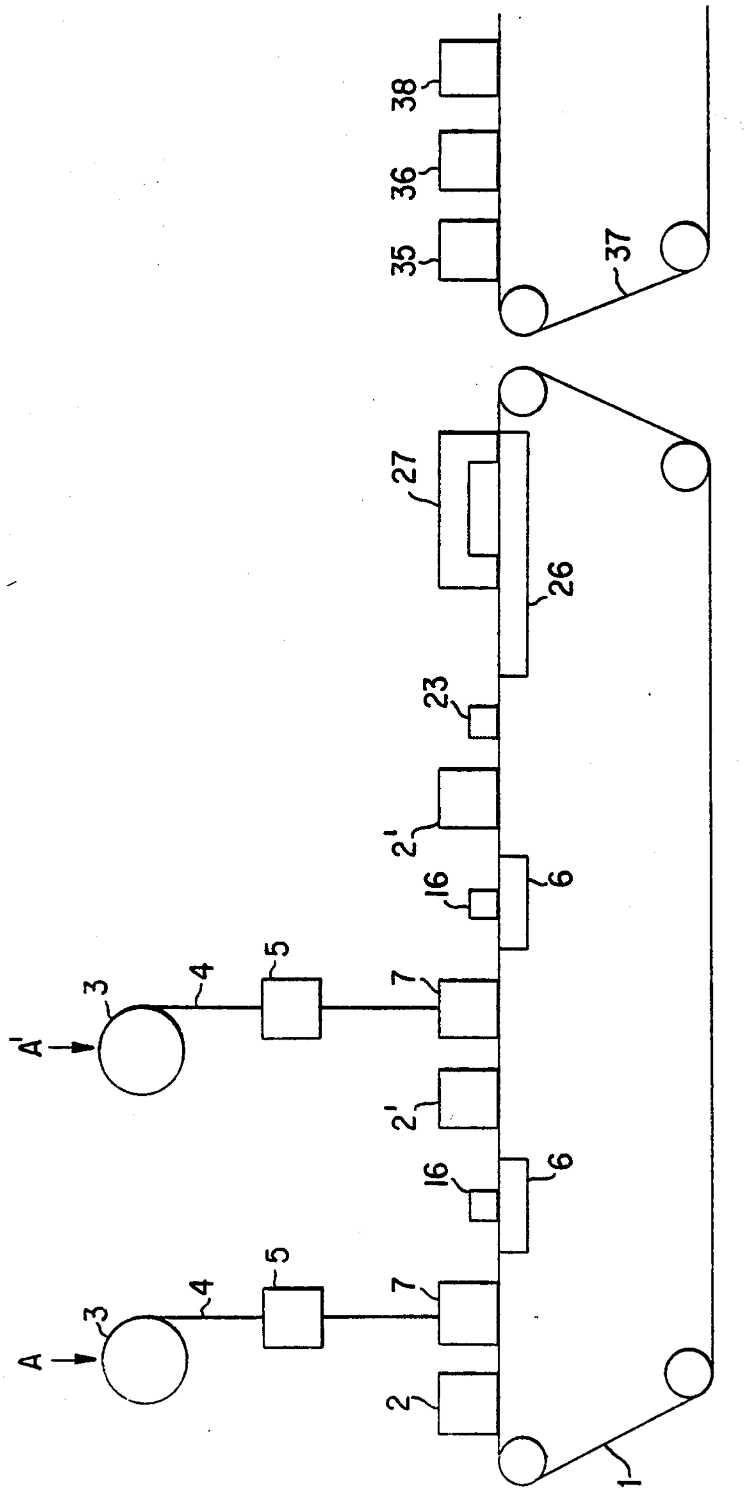
FIG. 1 represents a schematic side view of one possible embodiment of the device.

With reference to the drawing, the device for the manufacture in a continuous way of manufactured articles based on hydraulic binder mixes, consists of a conveyor belt 1, made of a porous material and driven by a motor (not shown). On the upper part of the conveyor belt 1 there are arranged at least two stations, A and A', for the formation of thin uniform and superimposed layers of a hydraulic binder mix and a net. Each station A consists of: a roller 3 for the feeding of the net 4; a device 5 for wetting, impregnating and degassing the net 4 with surfactant or fluidizing agents for the hydraulic binder, or with aqueous dispersions of hydraulic binders, etc; a metering device 2 for dosing the hydraulic binder mix; a unit 7 to feed the net 4 over the mix layer and compacting elements 16; a device 6 for the initial extraction of the excess water in the compacting stage and a second metering device 2' of the hydraulic binder mix.

The impregnating device 15 consists of a container tank holding the impregnating suspension, and of a spreading or coating roller which fishes in the dispersion and laps the net 4 during its passage.

Figure 5:
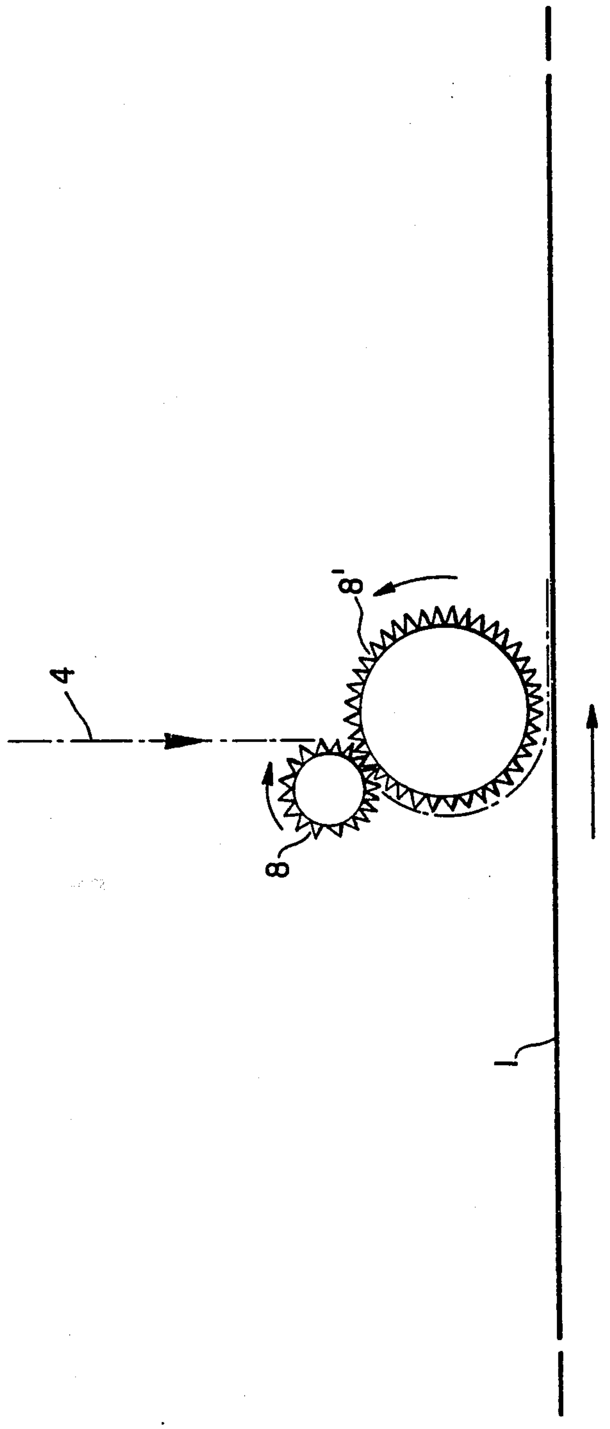
FIG. 5 represents a schematic side view of the rollers feeding and depositing the net-like structure onto the hydraulic binder mix.

Feeding means 7 for the net 4 consist of two cooperating driving roller 8 and 8' provided on their surface with pins or with grooves (see FIG. 5), which feed and deposit the net 4 onto the conveyor belt 1 which carries the thin layer of mix deposited by the dosing unit 2.

The roller 8' of the feeding means 7 is located near the conveyor belt 1 so that its generating line is distanced from said conveyor belt by just a slightly greater distance than the thickness of the thin layer of the mix.

Figure 2:
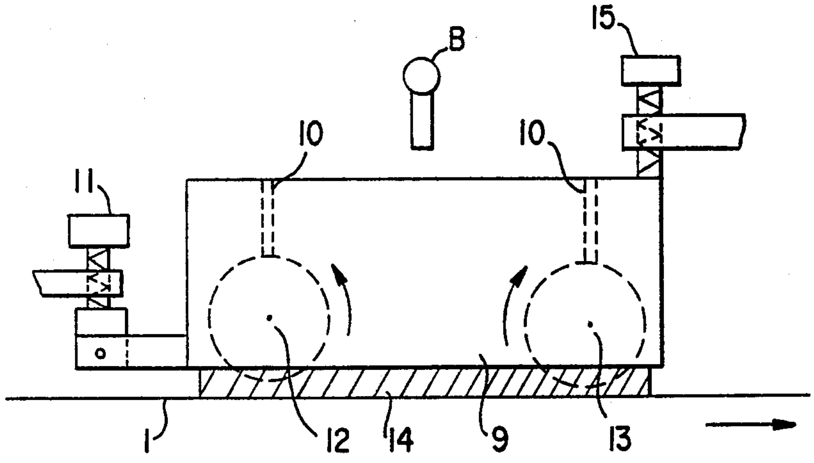
FIG. 2 is a schematic side view of a metering unit for the hydraulic-binders mix.

With reference to FIG. 2, each dosing device 2 and 2' consists of a containment box 9 for the mix being fed from one feeding line B. Said containment box is provided, at its two ends, with two rollers 12 and 13, each provided with corresponding scraper blades 10. The side walls of the containment box 9 rest on the porous conveyor belt by means of gaskets 14 mounted on elastic supports so as to allow the adjustment in height of the containment box and to thus avoid the lateral flowing out of the mix.

Rollers 12 and 13 are driven by motors (not shown) and revolve in opposite directions to each other, with linear velocities that may be different from each other. The first roller 12, arranged at the inlet end of the conveyor belt 1, revolves in the same direction as that of the progression of the conveyor belt 1, while the second roller 13, arranged at the outlet end of the conveyor belt 1, revolves in the opposite direction of conveyor 1.

The first roller 12 and the second roller 13 may be adjusted in height with respect to the conveyor belt 1 through an adjusting system 11 and 15 respectively. The height of the first roller 12 is adjusted so as to ensure the passage of the thin mix/net layer or layers coming from the preceding station A, while the height of the second roller 13 is adjusted with respect to the required thickness of the superimposed mix layer.

Figure 3:
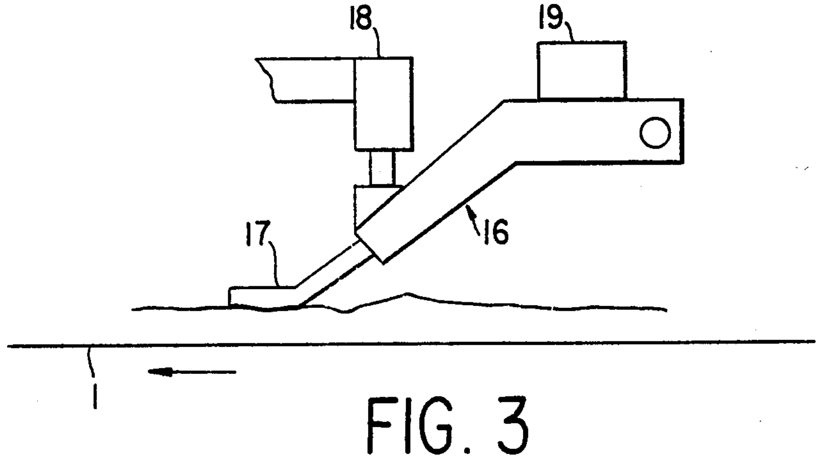
FIG. 3 is a schematic side view of a compacting unit which works by pressure and vertical and norizontal vibrations.
Figure 4:
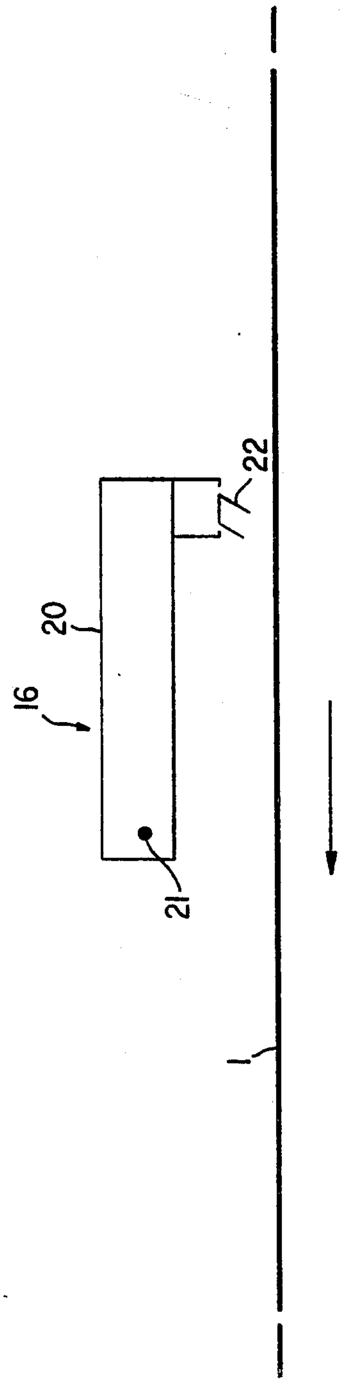
FIG. 4 represents a schematic side view of another compacting unit which works to develop vertical percussions to immerse the reinforcing net into the thin layer mix.

In order to ensure a complete and perfect immersion and impregnation of the net 4 in the thin layer of hydraulic binder mix, as well as for eliminating the possible residual air dragged along by the reinforcing net 4, there have been foreseen compacting elements 16, of which two, i.e., 16 and 16', have been schematically represented in FIGS. 3 and 4.

Element 16, schematically shown in FIG. 3, consists of a suspended flat steel blade 17 which is lightly pushed against the net/mix layer resting on the conveyor belt 1, by means of a suitable mechanism 18, and of a vibrator 19 which makes the blade vibrate both vertically and horizontally. The number of vibrations is comprised between 1,000 and 30,000 vibrations per minute, but preferably between 3,000 and 15,000 vibrations/minute.

A second type of compacting element 16', which may be used quite conveniently in the device object of the present invention, is illustrated schematically in FIG. 4. This compacting element 16' consists of a suspended metal arm 20 hinged at one end on a fixed pivot 21, and is provided at the other free end with percussion blades 22. Said percussion blades are inclined at angels comprised between 10° and 90°, preferably comprised between 20° and 80°, with respect to the direction of progress of the conveyor belt 1.

This compacting element 16' may effect a number of percussions comprised between 100 and 3,000 blow per minute (bpm), but preferably effects between 500 and 1,000 strokes/min. Co-operating with these compacting elements 16 and 16', there may be associated also other types of compacting devices such as, for instance, those with a vibratory motion, applied under the conveyor belt 1 so as to obtain the maximum possible compacting of the manufactured article.

Figure 6:
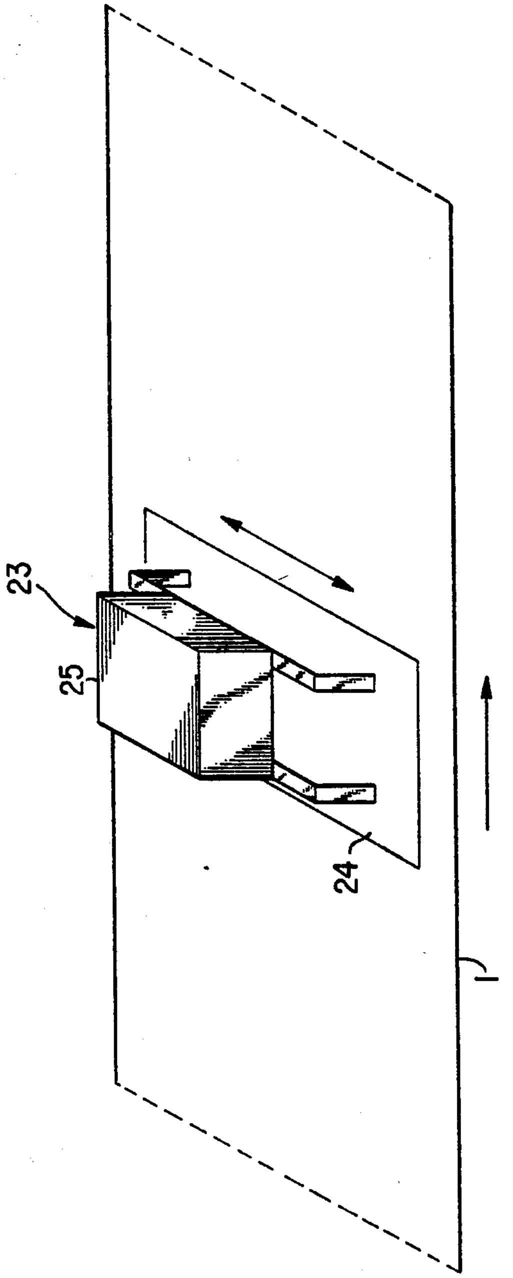
FIG. 6 represents a schematic view of the plate levelling and sizing device.

The reinforced and compacted multi-layer plate thus obtained is levelled, as far as its surface is concerned, in a levelling and sizing station 23, illustrated in FIG. 6. Said station 23 consists of a metal plate 24 and a vibrator 25 fixed to that same plate. Vibrator 25, which may be of the electric type, imparts to plate 24 alternating horizontal movements in a perpendicular sense with respect to the direction of advancement of the conveyor belt 1, but lying on the same plane of advancement of conveyor belt 1. The distance between plate 24 and the surface of the plate is accurately adjusted so as to obtain the desired thickness.

Subsequently the multi-layers plate, compacted and levelled, thus obtained is made to pass from the conveyor belt 1 through a final vacuum suction station in order to remove the excess water. Said vacuum suction station 27 consists of suction or aspirating units 26 arranged in correspondence with one or both faces of the plate, but preferably arranged underneath the plate.

Figure 7:
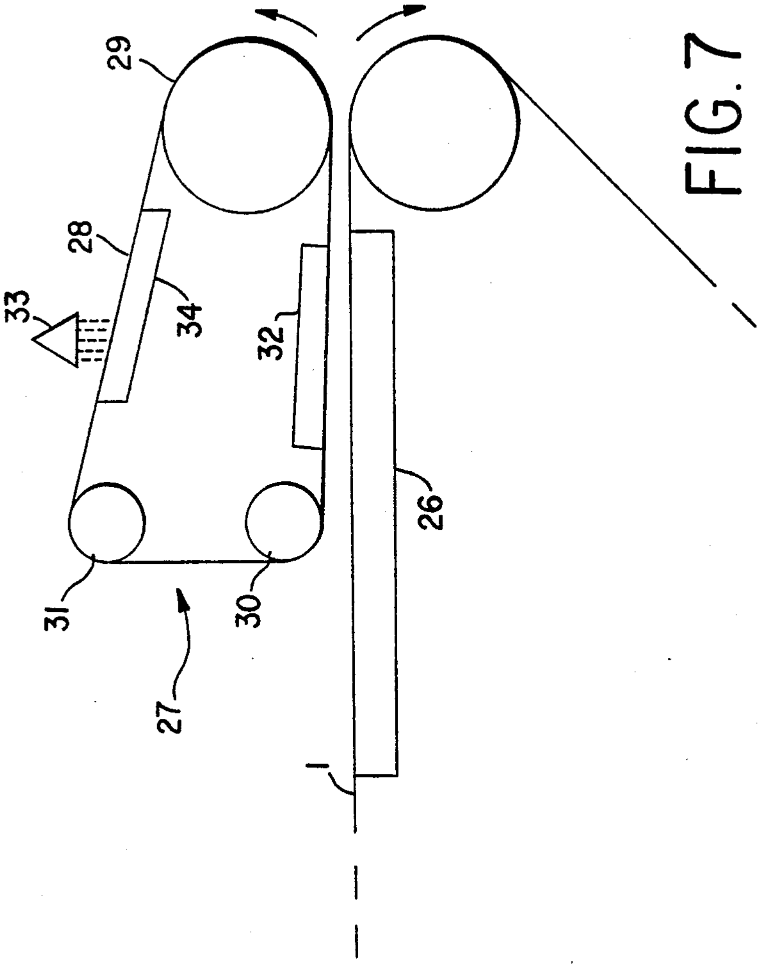
FIG. 7 represents a schematic side view of the plate pressing-station.

The plate is then subjected to pressing in a pressing station 27, illustrated in detail in FIG. 7. Said pressing station 27 consists of an advancing pressing belt 28 of porous material, superimposed on conveyor belt 1, which carries the reinforced plate, and stretched over roller 29, 30 and 31, of which at least one is a driving roller. The distance between the two mutually facing surfaces of the two belts 1 and 28 decreases in the direction of the advancement of the plate, so that the latter is pressed between the two belts with a gradually increasing pressure. On the upper part of the pressing belt 28 there may be provided a washing element 33 and a suction unit 34 is order to clean and dry said belt before it meets the moist plate.

The pressing station 27 may be provided with suction elements 32 for the extraction of the water that is freed during the pressing stage of the plates.

The pressed plates coming out between the belt 1 and 28, are cut up to required size at cutting stations 35 and 36, of the known type, and are then carried away by a further conveyor belt 37 and picked up by suction cups (feeding suckers) 38 for stocking or for the starting of the known forming operations.

The device object of this invention allows to manufacture reinforced plates formed of one or more alternate layers of net and hydraulic binder mixes, as well as it allows to vary both the quality of the hydraulic binders fed to the various A stations as well as the types of reinforcing net used in the production of the plate.

The device object of the present invention has been described with reference to the figures of the attached schematical drawings which represent an illustrative and exemplifying embodiment of the present invention. Thus, changes, modifications and variations in its practical realization or execution within the scope of this invention are possible and permissible without departing from the spirit and scope of the invention.

What we claim is:

1. A process for the continuous production of reinforced manufactured articles consisting of a succession of layers of hydraulic binder mixes and open nets made of fibrilled synthetic films, said process comprising the following phases:

feeding to a single conveyor belt, made of porous material, a hydraulic binder mix in the form of a thin uniform layer;

feeding to the single conveyor belt a net-like structure with a reinforcing function;

immersion and impregnation of the reinforcing net into the thin mix layer, and compacting thereof with the hydraulic binder all on the single conveyor belt;

initial extraction of excess water during the compacting phase, until the content of water is between 15% and 40% with respect to dry product on the single conveyor belt;

successive feeding of further layers of hydraulic binder mix alternated with nets of fibrilled polyolefinic films to form a plate, with a subsequent compacting and extraction of the water all on the single conveyor belt;

levelling-sizing of the surface of the plate consisting of a plurality of hydraulic binder/net layers on the single conveyor belt;

final extraction under vacuum of the excess water on the single conveyor belt;

pressing of the plate and extraction of the outflowing water;

cutting the plate to the desired size.

2. The process of claim 1, in which the net-like reinforcing structure is pre-impregnated with a solution of a surfactant.

3. The process of claim 1, in which the net-like reinforcing structure is pre-impregnated with a fluidizing agent for the hydraulic binder mix.

4. The process of claim 1, in which the net-like reinforcing structure is pre-impregnated with an aqueous dispersion of hydraulic binder.

* * * * *